United States Patent
Palumbo et al.

(10) Patent No.: US 7,775,375 B2
(45) Date of Patent: Aug. 17, 2010

(54) REDUNDANT ULTRAFILTRATION DEVICE

(75) Inventors: Giuseppe Palumbo, Modena (IT); James Summerton, Park Ridge, NJ (US)

(73) Assignees: Medica S.R.L., Medolla (IT); Nephros, Inc., New York, NY (US)

(*) Notice: Subject to any disclaimer, the term of this patent is extended or adjusted under 35 U.S.C. 154(b) by 1009 days.

(21) Appl. No.: 11/454,629

(22) Filed: Jun. 15, 2006

(65) Prior Publication Data
US 2009/0078625 A1   Mar. 26, 2009

Related U.S. Application Data

(60) Provisional application No. 60/734,006, filed on Nov. 3, 2005.

(51) Int. Cl.
- B01D 29/56 (2006.01)
- B01D 35/143 (2006.01)
- B01D 63/04 (2006.01)
- B01D 69/08 (2006.01)
- B01D 63/00 (2006.01)
- B01D 69/00 (2006.01)

(52) U.S. Cl. .......... 210/489; 210/94; 210/500.23; 210/252; 210/321.64; 210/321.73; 210/321.82; 210/335

(58) Field of Classification Search .......... None
See application file for complete search history.

(56) References Cited

U.S. PATENT DOCUMENTS

| | | | |
|---|---|---|---|
| 3,503,515 A * | 3/1970 | Tomsic | 210/321.88 |
| 3,579,441 A | 5/1971 | Brown | |
| 3,878,095 A | 4/1975 | Frasier et al. | |
| 3,882,020 A | 5/1975 | Cere | |
| 3,884,814 A * | 5/1975 | Vogt et al. | 210/321.81 |
| 3,946,731 A | 3/1976 | Lichtenstein | |
| 3,959,143 A | 5/1976 | Arvanitakis | |
| 3,976,576 A | 8/1976 | Jacobsen et al. | |

(Continued)

FOREIGN PATENT DOCUMENTS

EP   0076422   4/1983

(Continued)

*Primary Examiner*—Duane Smith
*Assistant Examiner*—Madeline Gonzalez
(74) *Attorney, Agent, or Firm*—Leason Ellis LLP.

(57) ABSTRACT

According to one aspect of the present invention, a dual stage filtration apparatus includes a cartridge having a first end and an opposing second end and a first filtration stage including a first bundle of first semi-permeable filtering elements and a second filtration stage including a second bundle of second semi-permeable filtering elements. The cartridge has a fluid inlet port for receiving raw unfiltered fluid into the first filtration stage and a fluid outlet port for discharging purified fluid after it has passed through the first and second filtration stages. The apparatus has an intrastage space that receives fluid that has been filtered in the first filtration stage prior to being filtered again in the second filtration stage, and the fluid inlet port is in fluid communication only with the first filtration stage, while the fluid outlet port is in fluid communication only with the second filtration stage. According to one aspect of the present invention, both ends of the first semi-permeable filtering elements are disposed and open at the first end and both ends of the second semi-permeable filtering elements are disposed and open at the second end.

23 Claims, 3 Drawing Sheets

U.S. PATENT DOCUMENTS

| | | | |
|---|---|---|---|
| 4,038,190 A | 7/1977 | Baudet et al. | |
| D245,811 S | 9/1977 | Gics | |
| 4,056,467 A | 11/1977 | Christen et al. | |
| 4,115,277 A | 9/1978 | Swank | |
| 4,118,314 A | 10/1978 | Yoshida et al. | |
| 4,134,834 A | 1/1979 | Brous | |
| 4,140,637 A * | 2/1979 | Walter | 210/321.79 |
| 4,141,835 A | 2/1979 | Schael et al. | |
| 4,219,422 A | 8/1980 | Knothe et al. | |
| D257,689 S | 12/1980 | Riede et al. | |
| D258,837 S | 4/1981 | Spranger et al. | |
| 4,322,232 A * | 3/1982 | Beane | 55/360 |
| 4,326,955 A | 4/1982 | Babb et al. | |
| 4,341,601 A | 7/1982 | Hartig | |
| RE31,029 E | 9/1982 | Schael et al. | |
| D267,037 S | 11/1982 | Spranger et al. | |
| 4,381,999 A | 5/1983 | Boucher et al. | |
| 4,416,782 A * | 11/1983 | Kerres | 210/634 |
| 4,424,098 A | 1/1984 | Hartig | |
| 4,468,329 A | 8/1984 | Shaldon et al. | |
| 4,498,990 A | 2/1985 | Shaldon et al. | |
| 4,585,523 A | 4/1986 | Giddings | |
| 4,636,307 A * | 1/1987 | Inoue et al. | 210/188 |
| 4,647,378 A | 3/1987 | Minami et al. | |
| 4,663,058 A | 5/1987 | Wells et al. | |
| 4,702,829 A | 10/1987 | Polaschegg et al. | |
| 4,708,802 A | 11/1987 | Rath et al. | |
| 4,722,798 A | 2/1988 | Goss | |
| 4,770,769 A | 9/1988 | Schael | |
| 4,772,390 A * | 9/1988 | Kawai et al. | 210/651 |
| 4,784,495 A | 11/1988 | Jonsson et al. | |
| 4,784,768 A | 11/1988 | Mathieu et al. | |
| 4,834,888 A | 5/1989 | Polaschegg et al. | |
| 4,861,485 A | 8/1989 | Fecondini et al. | |
| 4,917,798 A | 4/1990 | Liou et al. | |
| 4,933,046 A | 6/1990 | May | |
| 5,011,607 A | 4/1991 | Shinzato et al. | |
| 5,013,437 A | 5/1991 | Trimmer et al. | |
| 5,069,788 A | 12/1991 | Radovich et al. | |
| 5,075,003 A | 12/1991 | Aoyagi et al. | |
| 5,114,580 A | 5/1992 | Ahmad et al. | |
| 5,160,673 A * | 11/1992 | Wollbeck et al. | 264/45.1 |
| 5,176,725 A | 1/1993 | Puri et al. | |
| 5,178,763 A | 1/1993 | Delaunay et al. | |
| 5,194,157 A | 3/1993 | Ghezzi et al. | |
| 5,198,110 A * | 3/1993 | Hanai et al. | 210/321.79 |
| 5,211,812 A | 5/1993 | Vielberth et al. | |
| 5,211,849 A | 5/1993 | Kitaevich et al. | |
| 5,211,850 A | 5/1993 | Shettigar et al. | |
| 5,238,561 A | 8/1993 | Sanda et al. | |
| 5,240,610 A | 8/1993 | Tani et al. | |
| 5,244,568 A | 9/1993 | Lindsay et al. | |
| 5,282,964 A | 2/1994 | Young et al. | |
| 5,318,750 A | 6/1994 | Lascombes et al. | |
| 5,397,411 A * | 3/1995 | Costello et al. | 156/154 |
| 5,431,811 A | 7/1995 | Tusini et al. | |
| 5,476,592 A | 12/1995 | Simard et al. | |
| 5,487,827 A | 1/1996 | Peterson et al. | |
| 5,511,875 A | 4/1996 | Jonsson et al. | |
| 5,512,141 A | 4/1996 | Koistinen et al. | |
| 5,536,412 A | 7/1996 | Ash | |
| 5,545,131 A | 8/1996 | Davankov et al. | |
| 5,578,223 A | 11/1996 | Bene et al. | |
| 5,587,053 A | 12/1996 | Keith | |
| 5,632,897 A | 5/1997 | Mathieu et al. | |
| 5,634,269 A | 6/1997 | Lowenstein et al. | |
| 5,660,722 A | 8/1997 | Nederlof et al. | |
| 5,671,804 A | 9/1997 | Kordelin et al. | |
| 5,679,260 A | 10/1997 | Boos et al. | |
| 5,690,831 A | 11/1997 | Koistinen et al. | |
| 5,700,372 A | 12/1997 | Takesawa et al. | |
| 5,702,597 A | 12/1997 | Chevallet et al. | |
| 5,711,883 A | 1/1998 | Folden et al. | |
| 5,725,775 A | 3/1998 | Bene et al. | |
| 5,744,042 A | 4/1998 | Stange et al. | |
| 5,770,020 A | 6/1998 | Thomas et al. | |
| 5,808,181 A | 9/1998 | Wamsiedler et al. | |
| 5,824,213 A | 10/1998 | Utterberg | |
| 5,846,419 A | 12/1998 | Nederlof et al. | |
| 5,871,694 A | 2/1999 | Beden et al. | |
| 5,882,516 A | 3/1999 | Gross et al. | |
| 5,927,383 A | 7/1999 | Ramm-Schmidt et al. | |
| 5,942,112 A | 8/1999 | Ishak | |
| 5,968,321 A | 10/1999 | Sears | |
| 5,972,211 A | 10/1999 | Jones | |
| 5,992,508 A | 11/1999 | Lowenstein et al. | |
| 6,039,877 A | 3/2000 | Chevallet et al. | |
| 6,059,024 A | 5/2000 | Ramshaw et al. | |
| 6,117,100 A | 9/2000 | Powers et al. | |
| 6,139,739 A * | 10/2000 | Hamlin et al. | 210/315 |
| 6,139,748 A | 10/2000 | Ericson et al. | |
| 6,200,485 B1 | 3/2001 | Kitaevich et al. | |
| 6,277,292 B1 | 8/2001 | Reid | |
| 6,287,516 B1 | 9/2001 | Matson et al. | |
| 6,379,564 B1 | 4/2002 | Rohrbach et al. | |
| 6,558,340 B1 | 5/2003 | Traeger et al. | |
| 6,582,385 B2 | 6/2003 | Burbank et al. | |
| 6,595,944 B2 | 7/2003 | Balschat et al. | |
| 6,623,638 B2 | 9/2003 | Watkins et al. | |
| 6,645,166 B2 | 11/2003 | Scheunert et al. | |
| 6,685,831 B2 | 2/2004 | Donig et al. | |
| 6,719,907 B2 | 4/2004 | Collins et al. | |
| 6,733,676 B2 | 5/2004 | Takai et al. | |
| 6,951,611 B2 | 10/2005 | Dannenmaier et al. | |

FOREIGN PATENT DOCUMENTS

| | | |
|---|---|---|
| WO | WO-00/44478 | 8/2000 |

* cited by examiner

REDUNDANT ULTRAFILTRATION DEVICE

CROSS-REFERENCE TO RELATED APPLICATION

The present application claims the benefit of U.S. patent application Ser. No. 60/734,006, filed Nov. 3, 2005, which is hereby expressly incorporated by reference in its entirety.

TECHNICAL FIELD

The present invention relates to an apparatus for filtering a fluid, such as water, and, more particularly, to an apparatus that produces filtered fluid by passing the fluid through a first filtration stage and a second redundant filtration stage which are both preferably contained in the same cartridge.

BACKGROUND

There are a number of settings and applications where a purified fluid is needed. This includes, but is not limited to, sterile fluid for infusion, consumption, and/or bathing of patients with compromised immune systems, and further, other laboratory or industrial applications or uses where purified (sterilized) fluid is required. In a number of applications, tap water from a municipality can not be used even for bathing of a patient that may have a suppressed or weakened immune system or has some other condition where particulate and other foreign matter, including bacteria, contained in the tap water can jeopardize the health of the patient.

For example, there have been a number of recent outbreaks of Legionanaires' disease that have been linked to an infected water supply and the patient coming into contact with this supply. Legionellosis is an infection caused by the genus of Gram negative bacteria *Legionella*, notably, *L. pneumophila*. *L. pneumophila* is an ubiquitous aquatic organism that thrives in warm environments and typically accounts for over 90% of Legionnaires disease. Legionellosis infection occurs after persons have breathed mists that come from a water source (e.g., air conditioning cooling towers, whirlpool spas, and showers) contaminated with *Legionella* bacteria. Persons may be exposed to these mists in hotels, workplaces, hospitals or public places. *Legionella* organisms can be found in many types of water systems. The bacteria will grow in water temperatures from 68° F. to 124° F. However, the bacteria reproduce at the greatest rate in warm, stagnant water, such as that found in certain plumbing systems and hot water tanks, cooling towers and evaporative condensers of large air-conditioning systems and whirlpool spas.

This is merely one example of a type of bacteria that can be present in water and cause health problems and in some cases be fatal when consumed or when the patient comes into contact with infected potable water. Other types of bacteria can cause stomach aliments when consumed or other undesired health issues.

In order to ensure a clean, healthy supply of water, a filter device or the like is often used to clean unwanted foreign matter from the water. Such a device will often have a filter membrane or the like that filters the water supply. In some settings where it is critical to have a sterile supply of water or the like, a redundant filtration system is provided to ensure the necessary level of safety. These types of systems include not only a first filtration stage but also a second filtration stage that acts as a redundant filtration stage since it receives filtered water from the first stage and then performs a second filtration operation on the filtered water to ensure that water discharged from the device is purified and suitable for use.

It will also be appreciated by those skilled in the art that liquid (water) treatment facilities are needed in various fields which require treatment of water on site, such as at an industrial plant or the like, as well as in-field uses where it is desirable for the water to be treated at a remote location, such as during a camping trip or at a remote military location etc., where it is difficult or impossible to contain and supply potable water. For example, when camping or hiking, it is very cumbersome to carry the necessary water supply due to the sheer weight of the water itself. This makes it difficult since it is an absolute requirement for an individual to consume the necessary amounts of water to replenish fluid in the body and remain properly hydrated.

Unfortunately, access to a potable water supply may be difficult, if not impossible, depending upon the circumstances and the precise location. In addition, in locations that are either remote and/or dangerous, such as a military operation, it may be difficult for a person to have the time or ability to purify a water supply. For example, when camping or when otherwise being in a natural setting, it may be unsafe to drink running water from rivers, streams, lakes, etc., since these sources may contain foreign matter, such as microorganisms, organic wastes, etc., that can at the very least lead to sickness and discomfort and at worst, can even lead to serious health concerns and even death in the most extreme situations, as when harmful chemicals or poisonous natural elements are consumed.

There are a number of governmental bodies and agencies that undertake regulating the public drinking water supply. In particular, the Environmental Protection Agency (EPA) and the Occupational Safety and Health Administration (OSHA) assure the safety and health of the public by setting and enforcing standards both outside and inside the workplace. There are a number of regulations to govern the standards that apply to water consumption and especially, public water systems. The standards protect public health by limiting the levels of contaminants in drinking water, with some common contaminants being microorganisms, organic matter, inorganic and organic chemicals, disinfection by-products, disinfectants, etc.

However and as previously mentioned, it is difficult to carry and/or generate a sufficient supply of drinking water when an individual is located in a remote location, such as the wilderness, even when there is abundant water around since the water may not be potable. While there has been work done in the field of portable water treatment facilities, these facilities and systems tend to be either too complex, cumbersome and generally impractical since they most often are not that portable in design.

Moreover, there is a need for a simple single cartridge design that can be used in remote or stationary applications and is constructed to provide redundant filtration within the single cartridge body or casing.

SUMMARY

According to one aspect of the present invention, a dual stage filtration apparatus includes a cartridge having a first end and an opposing second end and a first filtration stage including a first bundle of first semi-permeable filtering elements and a second filtration stage including a second bundle of second semi-permeable filtering elements. The cartridge has a fluid inlet port for receiving raw unfiltered fluid into the first filtration stage and a fluid outlet port for discharging purified fluid after it has passed through the first and second filtration stages.

The apparatus has an intrastage space that receives fluid that has been filtered in the first filtration stage prior to being filtered again in the second filtration stage, and the fluid inlet port is in fluid communication only with the first filtration stage, while the fluid outlet port is in fluid communication only with the second filtration stage.

According to one aspect of the present invention, both ends of the first semi-permeable filtering elements are disposed and open at the first end and both ends of the second semi-permeable filtering elements are disposed and open at the second end.

According to another aspect of the present invention, the first and second bundles are arranged in a looped manner with the two bundles intertwined with one another.

According to yet another aspect of the present invention, the first semi-permeable filtering elements are bent so as to form two arms connected by a first curved section and the second semi-permeable filtering elements are bent so as to form two arms connected by a second curved section. The first and second semi-permeable filtering elements are looped with respect to one another such that the first curved section is disposed between the two arms of the second semi-permeable filtering elements and the second curved section is disposed between the two arms of the first semi-permeable filtering elements.

The dual stage cartridge of the present invention can be used in either a portable apparatus or it can be incorporated into a stationary, fixed apparatus, such as at a processing or treatment facility.

BRIEF DESCRIPTION OF DRAWINGS

The foregoing and other features of the present invention will be more readily apparent from the following detailed description and drawings of illustrative embodiments of the invention wherein like reference numbers refer to similar elements throughout the several views and in which.

DETAILED DESCRIPTION OF THE PREFERRED EMBODIMENTS

As discussed herein, the term "purify" generally means to remove unwanted constituents from a substance and the term "sterilize" means to make free from living microorganisms. Thus, in some applications, the two terms can be used synonymously.

It will be appreciated that while the present application discusses the treatment of water in detail, other fluids can likewise be filtered and the present invention is not limited to the filtering of water.

In accordance with one aspect of the present invention, an apparatus is provided and includes a double or dual filtration design such that all of the filtration occurs in a first (or front) section of the filter and the second (or back) section serves a redundant safety filter. The use of the term redundant safety filter refers to its capability to remove similar size particulate or microorganisms from the fluid stream as the first filter stage. It does not imply, however, that its size or surface area is equal to that of the first filter stage.

Figure 1:
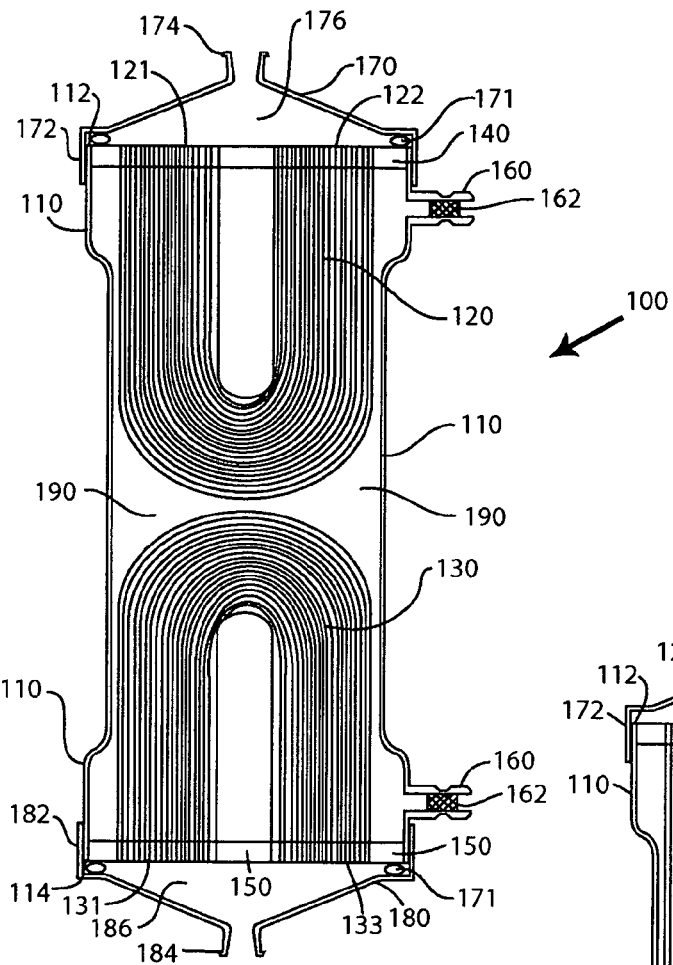
FIG. 1 is a cross-sectional view of a filtration device according to one embodiment.

Referring first to FIG. 1, an apparatus 100 is illustrated and is constructed to provide large volumes of sterile fluid from a non-sterile source and also provide the safety of redundant filtration. In accordance with one aspect, the apparatus 100 is constructed to provide the above functionality in such a form that conventional hollow fiber ultrafilter manufacturing processes can be employed.

The apparatus 100 is configured to have two filtration stages within a single external casing or housing 110. The casing 110 is a hollow structure that has a first end 112 and an opposing second end 114 and in particular, the casing 110 generally is in the form of a tubular structure. The casing 110 can have any number of different cross-sectional shapes, such as a circle (FIG. 2), oval, ellipse (FIG. 3), oblong, square, etc. The elliptical shape of FIG. 3 more easily accommodates the filtering media described below. The diameter or width of the casing 110 can be uniform from the first end 112 to the second end 114 or it can be variable from the first end 112 to the second end 114.

The apparatus 100 is configured so that two filtration stages are provided within a single external casing 110. This is accomplished by disposing a first bundle of semi-permeable hollow fiber membranes 120 and a second bundle or semi-permeable hollow fiber membranes 130 into the casing 110. The hollow fibers of the membranes 120, 130 are constructed such that it readily allows the passage of water and small molecular weight compounds, such as electrolytes. However, the hollow fibers exclude not only all bacteria but viruses and endotoxin fragments as well, thereby resulting in sterile pyrogen-free water.

In the first embodiment, the first bundle of semi-permeable hollow fiber membranes 120 is inserted into the first end 112 of the casing 110 and looped such that both ends 121, 122 of the fiber membranes 120 are disposed and located at the same end 112 of the casing 110. In other words, the first bundle of fiber membranes 120 is looped to assume a general U-shape, with both ends 121, 122 being disposed at and open at the first end 112 of the casing 110. Similarly, the second bundle of semi-permeable hollow fiber membranes 130 is inserted into the second end 114 of the casing 110 and looped such that both ends 131, 132 of the fiber membranes 130 are disposed and located at the same end 114 of the casing 110. In other words, the second bundle of fiber membranes 130 is looped to assume a general U-shape, with both ends 131, 132 being disposed at and open at the second end 114 of the casing 110.

Figure 4:
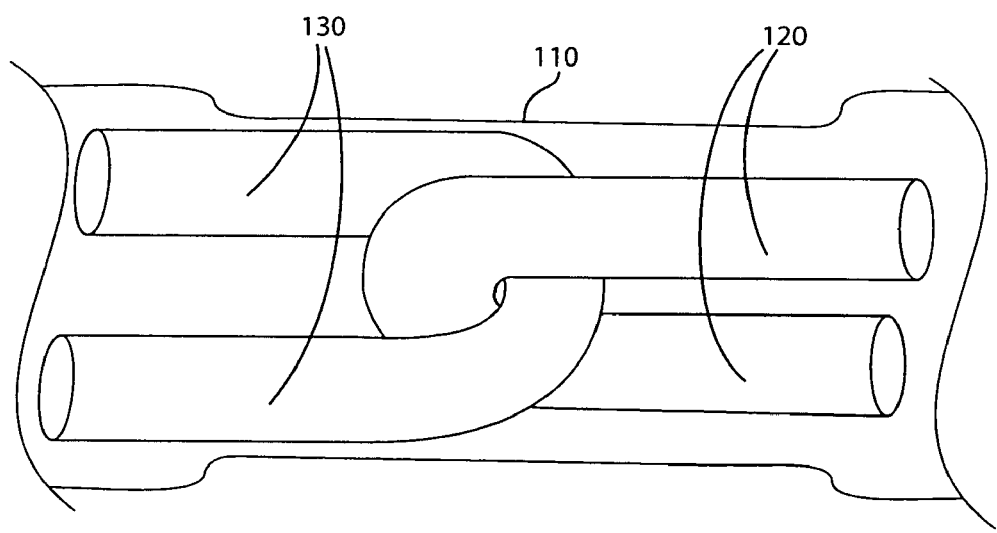
FIG. 4 is a perspective view in partial cross-section of another arrangement of a looped fiber arrangement.

The fiber bundles 120, 130 can be configured in a number of ways to minimize the stress on individual fibers of the loop. During formation of the bundles, the fibers can be laid down in a twisted rope manner so that the fiber bundles 120, 130 remain coiled together without stray fibers that can be broken or stressed. The fiber bundles 120, 130 can be chain linked together inside the casing 110 as shown in FIG. 4. This arrangement shown in FIG. 4 helps stabilize the bundles 120, 130 within the fluid filled casing 110.

The ends 121, 122 of the first fiber bundle 120 are encased in a first potting compound 140, such as polyurethane, which seals against the internal walls of the casing 110. As shown in FIG. 1, the first potting compound 140 is in the form of a layer of material that is disposed across the first end 112 of the casing 110; however, the ends 121, 122 of the fibers 120 remain open. Similarly, the ends 131, 132 of the second fiber bundle 130 are encased in a second potting compound 150 which seals against the internal walls of the casing 110. The second potting compound 150 is thus in the form of a layer of material that is disposed across the second end 114 of the casing 110, with the ends 131, 132 remaining open.

Figure 6:
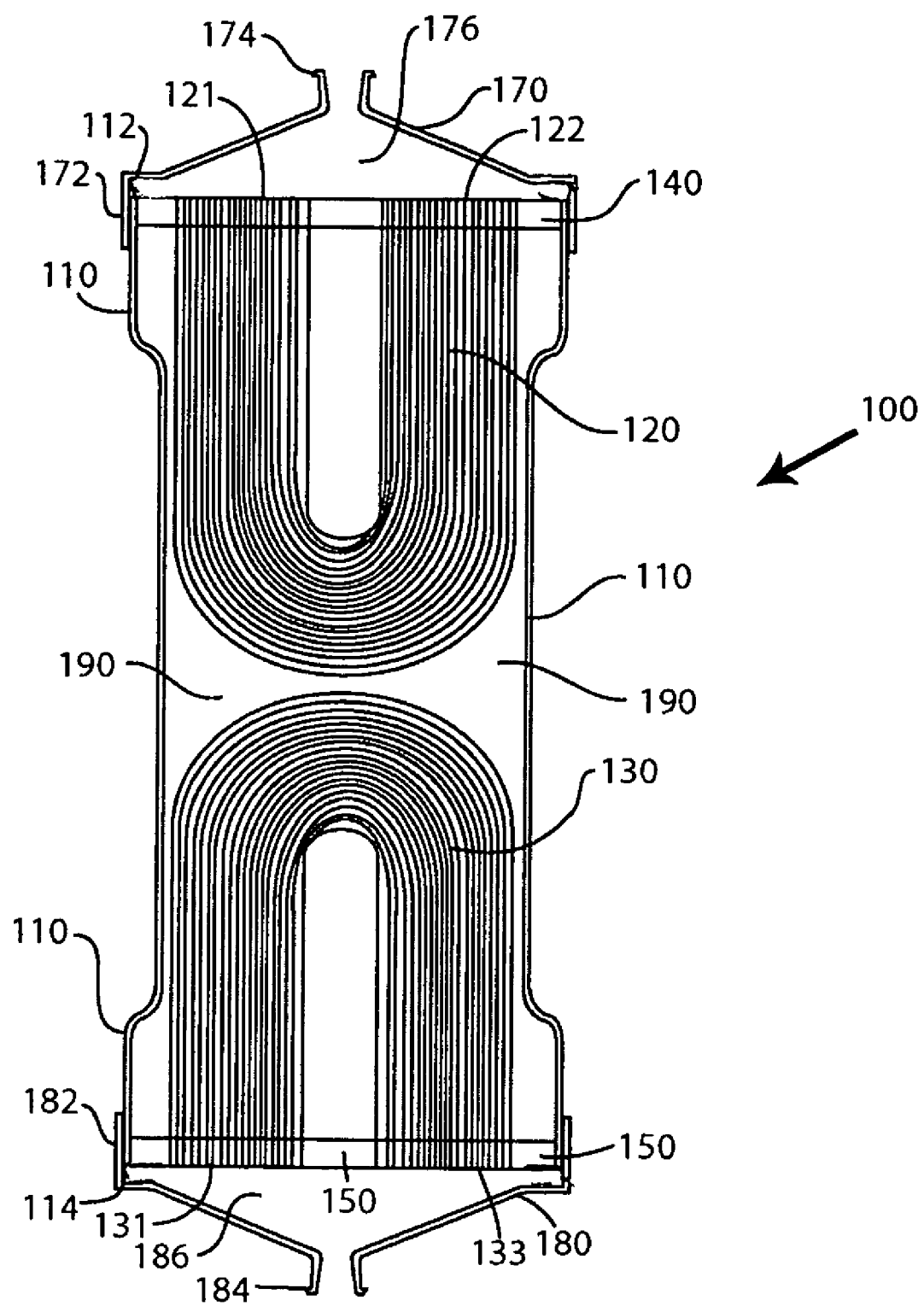
FIG. 6 is a cross-sectional view of a filtration device according to another embodiment.

Optionally, the casing 110 can have one or more external ports 160 that can be used in the potting process as shown in FIG. 1. The external ports 160 can then be sealed off with a seal member 162 or the like as part of the manufacturing process or later during the initial priming of the filter apparatus 100 after the ports 160 have served to vent the air from the casing 110. It should be understood by those versed in the art that the side ports are not a necessary element of the casing. Potting can take place a number of ways such that the casing remains a sealed tube without external holes as in FIG. 6.

The apparatus 100 includes a first cap or inlet cap 170 that is connected to the first end 112 of the casing 110 resulting in a fluid tight seal with the casing 110. The fluid seal can take place a number of ways including a bonding along a flange or lip portion 172 of the cap 170 as in FIG. 5 or via a sealing ring 171 on the casing edge or potting surface as shown in FIG. 1. The inlet cap 170 has an inlet port 174 that forms an entrance into a first end space 176 defined between the cap 170 and the first end 112 of the casing 110. Similarly, the apparatus 100 includes a second cap or outlet cap 180 that is connected to the second end 114 of the casing 110 resulting in a fluid tight seal with the casing 110 along a flange or lip portion 182 of the cap 180. The outlet cap 180 has an outlet port 184 that forms an exit from a second end space 186 defined between the cap 180 and the second end 114 of the casing 110. The inlet and outlet ports 174, 184 are constructed such that they can be easily connected to a plumbing or fluid accessory line.

Since the first and second bundles 120, 130 are not fluidly connected but instead define separate filter stages and due to the looped nature of the bundles 120, 130, an internal casing space 190 is formed therebetween and is intended to receive sterile filtrate from the first filter stage as described below. The precise shape of the internal casing space 190 is not critical and will vary depending upon the shape of the fiber bundles 120, 130 and the shape of the casing 110.

It will also be appreciated that while FIG. 1 shows an embodiment where the first and second bundles 120, 130 occupy substantially the same volume due to the bundles being substantially about the same size, the bundles 120, 130 can have different sizes. For example, the fiber bundle 120 associated with the primary first filter stage 120 can have a greater size (greater length) than the second filter stage 130 which provides redundant filtration and therefore, the first fiber bundle 120 will occupy a greater volume in the interior of the casing 110.

In accordance with the present invention, a feature 200 associated with the casing 100 provides easy visual verification of filter integrity. The apparatus 100 is constructed to have a double filtration design such that all the filtration occurs in the first filter stage defined by the first bundle of fibers 120 (front filter stage), while the second filter stage defined by the second bundle of fibers 130 (back filter stage) serves as a redundant safety filter.

In one embodiment, the casing 110 is formed of a transparent or translucent material, such as a transparent or translucent plastic, that allows visual examination of the filter media (fiber bundles 120, 130) inside the casing 110. The visual examination determines that no discoloration of the second filtration stage has occurred thereby providing evidence that the first filtration stage remains intact and the second filtration stage is redundantly filtering purified fluid. However, an opaque material can equally be used, but will not provide this feature.

Figure 2:
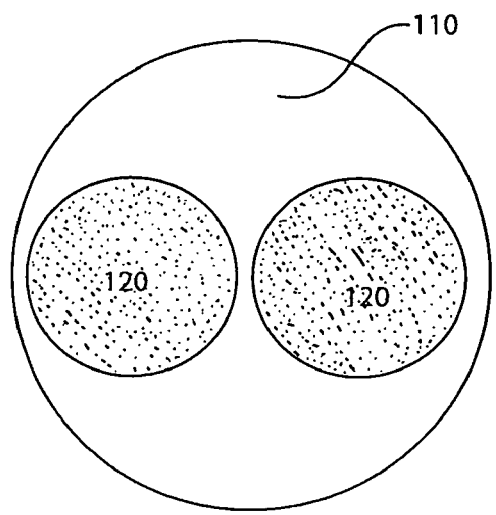
FIG. 2 is a cross-sectional view of a casing and fiber arrangement for use in the device of FIG. 1.
Figure 3:
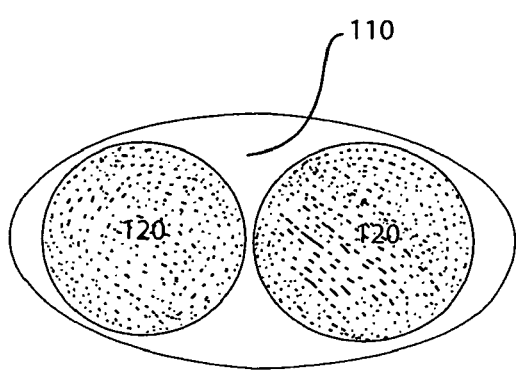
FIG. 3 is a cross-sectional view of another casing and fiber arrangement for use in the device of FIG. 1.

FIGS. 2-3 show different arrangements of the first fiber bundle 120 and the second fiber bundle 130 relative to casing 110. In FIG. 2, the casing 110 has a substantially circular cross-sectional shape (e.g., the casing is cylindrical) and the first fiber bundle 120 has a substantially circular shape. It will be appreciated that the second fiber bundle 130 can likewise have a circular shape. FIG. 3 shows a different embodiment where the casing 110 has more of an elliptical shape and the first fiber bundle 120 has a substantially circular shape. It will also be appreciated that each of the first and second fiber bundles 120, 130 can be bundled to have any number of different shapes. For example, while the fibers are typically bundled in circular shaped bundles, the fibers can equally be bundled in bundles that have other shapes, such as oval shaped, square shaped, triangular shaped, or an irregular shape.

In yet another aspect, the relative sizes in at least one dimension of the first and second fiber bundles 120, 130 can be different. In other words, the first fiber bundle 120 can have at least one of a length or width that is different from the second fiber bundle 130. For example, the first fiber bundle 120 can occupy less of an area in the casing 110 due to either having a smaller length and/or a smaller width than the second fiber bundles 130. Thus, while FIGS. 1-3 show the first and second fiber bundles 120, 130 being substantially the same, they can differ in construction and/or arrangement so that the two occupy different amounts of space in the casing 110. Typically, the primary filtration stage, in this case the first fiber bundle 120, will not be smaller than the second fiber bundle 130 since the second fiber bundle 130 is a redundant stage provided for safety reasons.

Figure 5:
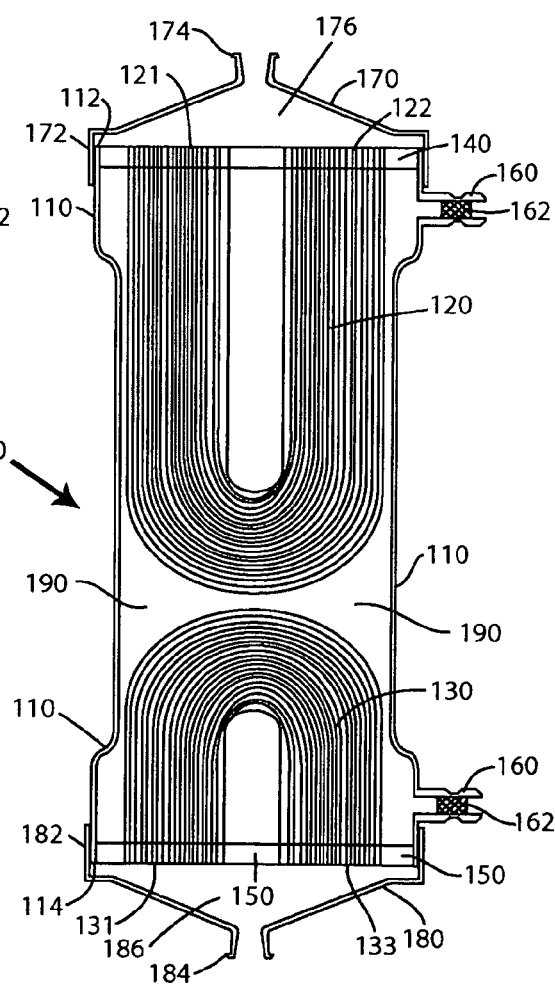
FIG. 5 is a cross-sectional view of a filtration device according to another embodiment.

According to one embodiment illustrated in FIG. 5, the first stage defined by the first fiber bundle 120 is greater than the second stage defined by the second fiber bundle 130. In other words, the length of the first fiber bundle 120 is greater than the length of the second fiber bundle 130 and thus, the first fiber bundle 120 has a greater surface area relative to the second fiber bundle 130 (this is illustrated in FIG. 5 with the second stage occupying a smaller area).

In another aspect, the smaller second stage acts as a restrictive feature (restrictor) in that the second stage controls and restricts flow of fluid through the device since the fluid that is filtered through the larger first stage can not simply flow straight through the device and out the fluid outlet port since the fluid must pass through the second fiber bundle 130 and into the second stage in order to be discharged through the fluid outlet port. By constructing the second stage to have a smaller area compared to the first stage, the second stage alters and controls the overall flow rate of the fluid through the device. In other words, a larger first stage can receive and handle more fluid, especially if the fluid is introduced to the first stage under pressure as in the case of a shower type device; however, this increased flow rate is not maintained since the fluid must pass through an area (second filtering elements) of reduced surface area. In effect by "funneling" or directing the fluid through an area that has reduced area, less fluid can be filtered per unit of time through the second bundle of fibers 130 and therefore, the overall flow rate of the fluid is reduced compared to a device that does not include a second stage and therefore is influenced solely by the filtering capability and rate of the first stage.

Because the second stage does not have as great a surface area compared to the first stage, less fluid can pass through and be processed by the second stage compared to the first stage, and therefore, the flow rate is decreased. Thus, the second stage acts as a flow restrictor when it is constructed in this manner to have a surface area that is less than the first stage. Benefits are realized by having the second stage act as a flow restriction and in particular, the integrity and life of the first stage are increased by reducing the overall flow rate of fluid through the device, while still maintaining a reasonable flow rate through the device. The life of the first fiber bundle 120 is increased by incorporating a smaller sized second stage since the flow rate through the first fiber bundle 120 is decreased resulting in less breakdown over time of the first fiber bundle. Since the second fiber bundle is a redundant filtration stage, its reduction in size does not jeopardize the overall performance of the apparatus. This arrangement also has the advantage of maintaining a more consistent overall flow rate of the device over time. With filtration over time the first filtration stage will become fouled with particulate thereby losing some of its filtration capacity. However, since the second filtration stage is restrictive and therefore the flow regulator, the overall flow capacity of the device will not change. It will also be appreciated that the reduction in overall surface area of the second stage can be accomplished in a number of different ways and in particular, the surface area of the second stage can be reduced by reducing the length of the second fiber bundle 130 and/or by reducing the width of the second fiber bundle 130.

It will also be appreciated that the dual stage filter apparatus 100 of the present invention can be incorporated into any number of different filtering systems including but not limited to the following: portable water filtration units, stationary water filtration units for use with or without existing plumbing systems, shower assemblies, laboratory water systems, or any other application where purified fluid (e.g., water) is desired. In other words, the dual stage apparatus 100 can be used in any number of different applications where a filter can be installed along a water treatment flow path.

Thus, while there have been shown, described, and pointed out fundamental novel features of the invention as applied to a preferred embodiment thereof, it will be understood that various omissions, substitutions, and changes in the form and details of the devices illustrated, and in their operation, may be made by those skilled in the art without departing from the spirit and scope of the invention. For example, it is expressly intended that all combinations of those elements and/or steps which perform substantially the same function, in substantially the same way, to achieve the same results are within the scope of the invention. Substitutions of elements from one described embodiment to another are also fully intended and contemplated. It is also to be understood that the drawings are not necessarily drawn to scale, but that they are merely conceptual in nature. It is the intention, therefore, to be limited only as indicated by the scope of the claims appended hereto.

While the present invention has been described in terms of sterilizing a fluid and in particular an aqueous solution, such as unfiltered water, it will be understood that the present apparatuses can be equally used to redundantly filter other fluids, including other liquids besides water or mixtures of fluids.

All references, publications, pending and issued patents are herein each incorporated by reference in their entirety.

What is claimed is:

1. A dual stage filtration apparatus comprising:
a cartridge having a first end and an opposing second end and a first filtration stage including first semi-permeable filtering elements and a second filtration stage including second semi-permeable filtering elements and a fluid inlet port for receiving raw unfiltered fluid and a fluid outlet port for discharging purified fluid after it has passed through the first and second filtration stages, wherein the apparatus has an intrastage space that receives fluid that has been filtered in the first filtration stage prior to being filtered again in the second filtration stage, the fluid inlet port being in fluid communication only with the first filtration stage, while the fluid outlet port is in fluid communication only with the second filtration stage, and wherein both ends of the first semi-permeable filtering elements are disposed and open at the first end of the cartridge and both ends of the second semi-permeable filtering elements are disposed and open at the second end of the cartridge, wherein the first semi-permeable filtering elements and the second semi-permeable filtering elements comprise hollow fibers.

2. The apparatus of claim 1, wherein the fluid comprises water.

3. The apparatus of claim 1, wherein the first semi-permeable filtering elements are contained along a first longitudinal length of the cartridge and the second semi-permeable filtering elements are contained along a second longitudinal length of the cartridge, with the first length being free of the second semi-permeable filtering elements and the second length being free of the first semi-permeable filtering elements.

4. The apparatus of claim 1, wherein the first semi-permeable filtering elements are contained within a first half of the cartridge and the second semi-permeable filtering elements are contained within a second half of the cartridge.

5. The apparatus of claim 1, wherein the first semi-permeable filtering elements are bent along their lengths so as to form a U-shaped structure with first and second open ends of the first semi-permeable filtering elements being adjacent one another at the first end of the cartridge.

6. The apparatus of claim 1, wherein the second semi-permeable filtering elements are bent along their lengths so as to form a U-shaped structure with the first and second open ends of the second semi-permeable filtering elements being adjacent one another at the second end of the cartridge.

7. The apparatus of claim 1, wherein the intrastage space has a minimum area at a location where the first and second semi-permeable filtering elements are closest to one another and has a maximum area along inner walls of the cartridge.

8. The apparatus of claim 1, further including a first header cap coupled to the first end and defining a first header space, the fluid inlet port being formed in the first header cap and a second header cap coupled to the second end and defining a second header space, the fluid outlet port being formed in the second header cap.

9. The apparatus of claim 1, wherein both ends of the first semi-permeable filtering elements are embedded in a first potting compound at the first end and both ends of the second semi-permeable filtering elements are embedded in a second potting compound.

10. The apparatus of claim 1, wherein a length of the first semi-permeable filtering elements is different from a length of the second semi-permeable filtering elements.

11. The apparatus of claim 1, wherein a cross-sectional area of the first semi-permeable filtering elements is different from a cross-sectional area of the second semi-permeable filtering elements.

12. The apparatus of claim 1, wherein the first semi-permeable filtering elements are intertwined with the second semi-permeable filtering elements.

13. The apparatus of claim 1, wherein the cartridge further includes first and second supplemental ports formed along a side wall of the cartridge and permitting access to an interior of the cartridge.

14. A dual stage filtration apparatus comprising:
a cartridge having a first end and an opposing second end and a first filtration stage including a first bundle of first semi-permeable filtering elements in the form of hollow fibers and a second filtration stage including a second bundle of second semi-permeable filtering elements in the form of hollow fibers and a fluid inlet port for receiving raw unfiltered fluid into the first filtration stage and a fluid outlet port for discharging purified fluid after it has passed through the first and second filtration stages, wherein the apparatus has an intrastage space that receives fluid that has been filtered in the first filtration stage prior to being filtered again in the second filtration stage, the fluid inlet port being in fluid communication only with the first filtration stage, while the fluid outlet port is in fluid communication only with the second filtration stage, and wherein the first and second bundles are arranged in a looped manner with the two bundles intertwined with one another such that both open ends of the first semi-permeable filtering elements are disposed at the first end of the cartridge and both open ends of the second semi-permeable filtering elements are disposed at the second end of the cartridge and therefore, the bundles of fibers extend in opposite directions within the cartridge.

15. A dual stage filtration apparatus comprising:

a cartridge having a first end and an opposing second end and a first filtration stage including first semi-permeable filtering elements in the form of a bundle of hollow fibers and a second filtration stage including second semi-permeable filtering elements in the form of a bundle of hollow fibers and a fluid inlet port for receiving raw unfiltered fluid and a fluid outlet port for discharging purified fluid after it has passed through the first and second filtration stages, wherein the apparatus has an intrastage space that receives fluid that has been filtered in the first filtration stage prior to being filtered again in the second filtration stage, the fluid inlet port being in fluid communication only with the first filtration stage, while the fluid outlet port is in fluid communication only with the second filtration stage, wherein both ends of the first semi-permeable filtering elements are disposed and open at the first end and both ends of the second semi-permeable filtering elements are disposed and open at the second end, and wherein the first semi-permeable filtering elements are bent so as to form two arms connected by a first curved section and the second semi-permeable filtering elements are bent so as to form two arms connected by a second curved section, the first and second semi-permeable filtering elements being looped with respect to one another such that the first curved section is disposed between the two arms of the second semi-permeable filtering elements and the second curved section is disposed between the two arms of the first semi-permeable filtering elements such that both open ends of the first semi-permeable filtering elements are disposed at the first end of the cartridge and both open ends of the second semi-permeable filtering elements are disposed at the second end of the cartridge and therefore, the bundles of fibers extend in opposite directions within the cartridge and extend outwardly away from the looped curved sections.

16. The apparatus of claim 15, wherein the intrastage space is formed in an interior of the cartridge between potting compounds formed at the first and second ends to securely hold the first and second semi-permeable filtering elements, respectively.

17. The apparatus of claim 15, wherein the first semi-permeable filtering elements are contained along a first longitudinal length of the cartridge and the second semi-permeable filtering elements are contained along a second longitudinal length of the cartridge, with the first length being free of the second semi-permeable filtering elements and the second length being free of the first semi-permeable filtering elements.

18. The apparatus of claim 15, wherein the first semi-permeable filtering elements are contained within a first half of the cartridge and the second semi-permeable filtering elements are contained within a second half of the cartridge.

19. The apparatus of claim 15, wherein a length of the first semi-permeable filtering elements is greater than a length of the second semi-permeable filtering elements.

20. The apparatus of claim 15, wherein a cross-sectional area of the first semi-permeable filtering elements is greater than a cross-sectional area of the second semi-permeable filtering elements.

21. The apparatus of claim 15 wherein the external casing is transparent or translucent such that the integrity of the first filtration stage can be verified by no discoloration in the membrane material of the second filtration stage.

22. The apparatus of claim 15, wherein open ends of the two arms of the first semi-permeable filtering elements are offset a predetermined angle from open ends of the two arms of the second semi-permeable filtering elements.

23. The apparatus of claim 22, wherein the predetermined angle is about 90 degrees.

* * * * *